S. R. ALBRIGHT.
POTATO MASHER AND BEATER.
APPLICATION FILED FEB. 11, 1909.
951,670.
Patented Mar. 8, 1910.
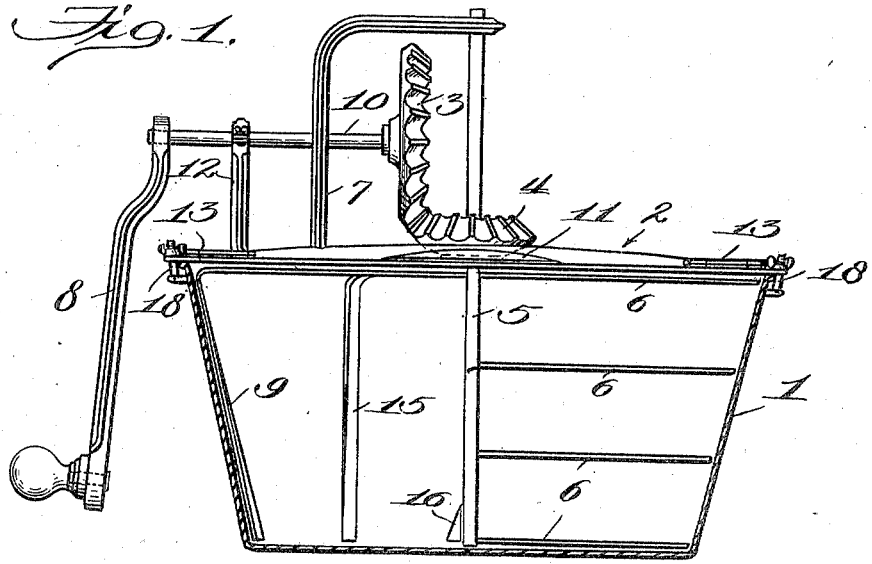
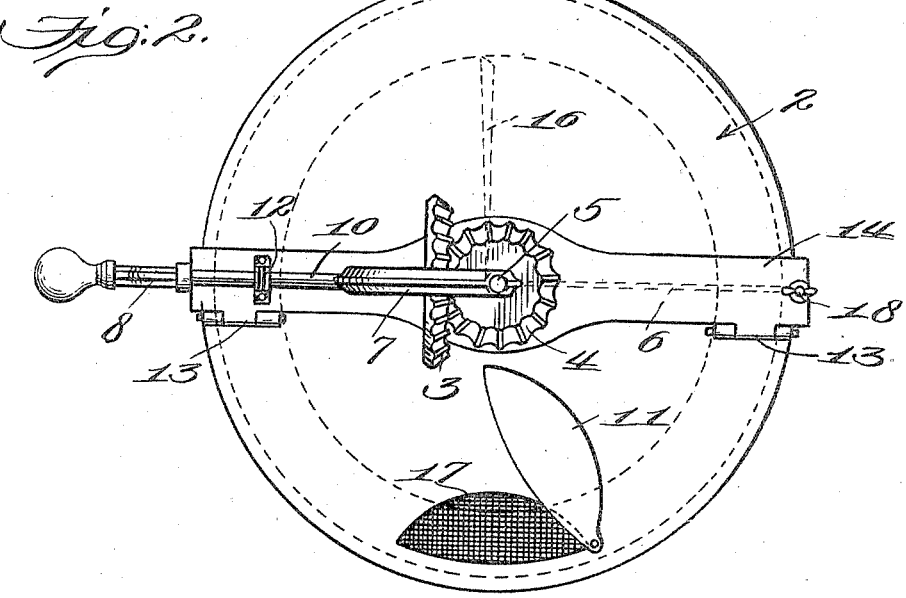
Witnesses:
Inventor
Samuel R. Albright

UNITED STATES PATENT OFFICE.

SAMUEL RALPH ALBRIGHT, OF ELLERSLIE, MARYLAND.

POTATO MASHER AND BEATER.

951,670. Specification of Letters Patent. Patented Mar. 8, 1910.

Application filed February 11, 1909. Serial No. 477,459.

*To all whom it may concern:*

Be it known that I, SAMUEL RALPH ALBRIGHT, a citizen of the United States, and a resident of Ellerslie, in the county of Allegany and State of Maryland, have invented certain new and useful Improvements in Potato Mashers and Beaters, of which the following is a specification.

The present invention is an improvement in mashing and beating machines, and its object comprises the production of an extremely simple, durable and effective machine of the specified class, which, while designed primarily for use in mashing and beating potatoes, may be employed with equal facility in the treatment of various other kindred substances that require to be treated in a similar manner either before or after cooking, the machine being constructed as a whole in such a manner that the various operating parts thereof may be readily taken apart for cleaning purposes and subsequently put together or assembled.

The preferred embodiment of the invention is illustrated in the accompanying drawings, wherein:

Figure 1 is an elevation of the improved machine, the receptacle being shown in section. Fig. 2 is a plan view. Fig. 3 is an enlarged detail view, partly in section, showing one of the cover attaching devices.

Reference being had to said drawings, and to the numerals marked thereon, 1 indicates the pan or receptacle in which the substances to be treated are placed, and 2 the lid or cover therefor, the latter element being composed of a central strap-like member 14, and a pair of segmental sections or members disposed upon opposite sides of and connected to the first-mentioned member. One of these segmental sections is rigidly secured to the strap-like member, while the other section is pivotally connected thereto by hinges 13, so as to permit of its being raised or lowered, and is also formed with a drainage opening normally covered by a pivotally-mounted closure 11. This opening is preferably protected by a wire screen 17. The ends of the strap 14 are designed to be connected to the upper edge or rim of the receptacle by means of suitable fastening devices 18.

Upon the strap 14 a short upstanding bracket 12 and an inverted L-shaped bracket 7 are mounted, the first-mentioned bracket and the vertical arm of the other bracket being formed with alining bearing openings through which projects a horizontal drive shaft 10, provided at its outer end with an operating handle 8, and at its inner end with a bevel gear 3. Gear 3 meshes with and drives a smaller bevel gear 4 secured to a vertical shaft 5 which is journaled in bearings provided in the strap 14 and the horizontal arm of bracket 7.

The various beaters employed are carried by the vertical shaft 5 and rotate therewith. These beaters comprise a series of parallel spikes 6 attached at their inner ends to said shaft; an angular blade 9 having one arm arranged adjacent to and parallel with strap 14 and likewise fastened to said shaft and its other arm inclined at the same angle as the side wall of the receptacle and arranged to travel against the surface of said wall, thereby serving as a scraper, to which end it is turned obliquely to said surface throughout the greater portion of its length; a vertical blade 15 fastened at its upper end to the horizontal arm of blade 9, and disposed obliquely to said arm, as shown in Fig. 5; and a horizontal scraper blade 16, triangular in cross-section. The last-mentioned blade is secured at its inner end to the lower end of shaft 5, and is disposed at right-angles to the vertical plane in which the angular blade 9 and the spikes 6 lie, said spikes projecting in the opposite direction from said angular blade.

Owing to the connection of the beaters to the vertical shaft, and to the connection of the latter with the cover 2, it will be obvious that the removal of the cover will effect that of the beating and driving mechanism which may then be readily cleaned.

What is claimed is:

1. In a machine of the class specified, the combination of a receptacle; a removable cover therefor comprising a central strap and a pair of sections arranged at opposite sides thereof, one section being rigidly and the other section pivotally secured to said strap; means for connecting the ends of said strap to the receptacle rim; a pair of upstanding brackets mounted upon the strap and formed with alining openings, one of said brackets having a lateral extension overhanging said strap; a horizontal shaft journaled in said openings; a vertical shaft journaled in alining openings formed in said strap and said extension, and having the lower portion thereof extending into the receptacle; beaters secured to said portion; gear connections between said shafts; and driving means carried by the horizontal shaft.

2. In a machine of the class specified, the combination of a receptacle; a removable cover therefor comprising a central strap and a pair of sections arranged at opposite sides thereof, one section being rigidly and the other section pivotally secured to the ends of said strap; means for connecting said strap to the receptacle rim; a pair of upstanding brackets mounted upon the strap and formed with alining openings, one of said brackets having a lateral extension overhanging said strap; a horizontal shaft journaled in said openings; a vertical shaft journaled in alining openings formed in said strap and said extension, and having the lower portion thereof extending into the receptacle; an angular blade secured to said shaft portion and comprising a horizontal arm, and an inclined arm arranged to travel against the side wall of said receptacle; a vertical blade carried by said horizontal arm; a series of horizontal spikes attached to said vertical shaft, a horizontal scraper secured to the lower end of said vertical shaft; gear connections between said shafts; and driving means carried by the horizontal shaft.

In testimony whereof I have signed my name to this specification in the presence of two subscribing witnesses.

SAMUEL RALPH ALBRIGHT.

Witnesses:
H. W. CAMPBELL,
WILLIAM H. COLE.